Sept. 29, 1970          S. M. WILLIS          3,530,607
IDENTIFICATION MEMBER
Filed Aug. 23, 1968
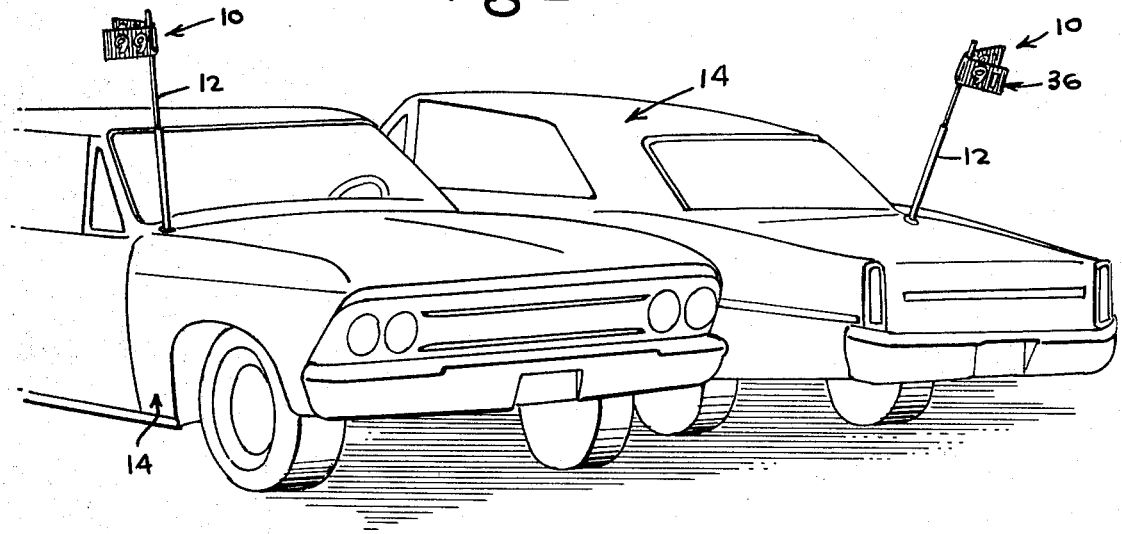
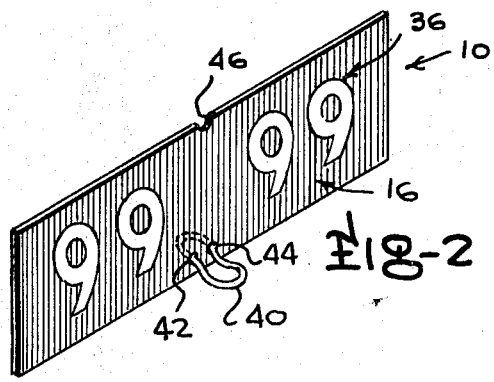
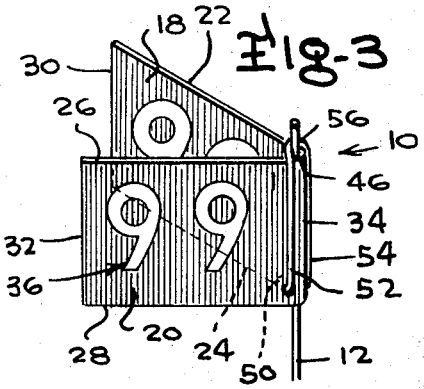
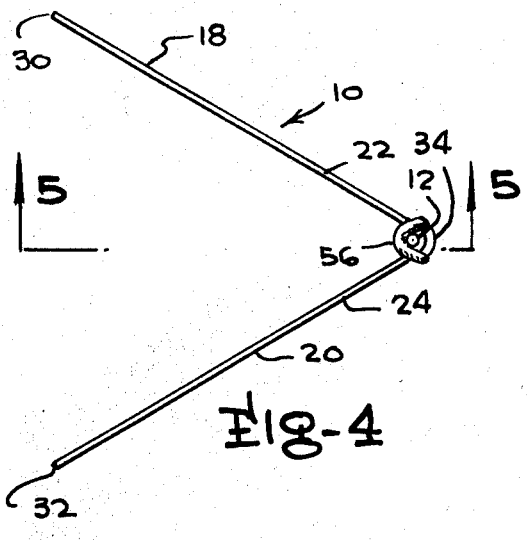
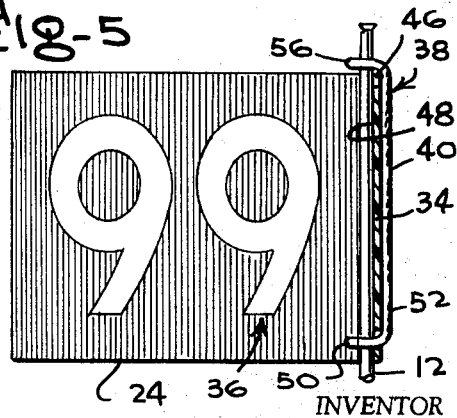
INVENTOR
SAMUEL M. WILLIS
BY *Robert G. McMorrow*
ATTORNEY ptember 29, 1970

United States Patent Office 3,530,607
Patented Sept. 29, 1970

3,530,607
IDENTIFICATION MEMBER
Samuel M. Willis, 6180 SW. 109 Court,
Miami, Fla. 33156
Filed Aug. 23, 1968, Ser. No. 754,930
Int. Cl. G09f 7/00
U.S. Cl. 40—129                                   5 Claims

ABSTRACT OF THE DISCLOSURE

A pair of panels are connected at a fold portion and have a cord extended through openings formed in the panels. The cord is engageable about an upstanding support both at the location of the openings and at a location above the panels to thereby frictionally engage the panels on the support for identification purposes.

BACKGROUND OF THE INVENTION

Field of the invention

This invention pertains to identification members, such as those used to locate vehicles in parking lots, garages, and the like.

Statement of the prior art

It has been previously proposed as a solution to the problem of effectively locating vehicles and the like in large groups thereof, as often encountered in parking lots, to use flags, cards and other materials which are attached in some manner to the vehicle and which contain distinguishable numbers or other indicia means. Such prior proposals, as exemplified by way of illustration in prior U.S. Pat. No. 2,342,017, include plates and the like with indicia thereon. The prior proposals are however subject to certain criticisms, centering on the bases of cost, difficulty of attachment and detachment, and limitations on the range of visibility thereof.

SUMMARY OF THE INVENTION

The present invention provides a multi-panel identification means which bears indicia visible from a maximum number of locations, and one which is readily attachable to an upright support. One environment of use wherein the invention apparatus is particularly advantages is that of identifying an article in a large group thereof, such as a vehicle in a parking lot. When storage of a number of automotive vehicles is necessary, as in repair lots, parking areas, and the like, the rapid location of a particular one of such vehicles is often a problem. In a case of servicing facilities, the location of a vehicle may be required at several different times in a short span of time, as for the performance of various operations on the vehicle by service personnel, and again when the customer calls for the vehicle. Moreover, the vehicle may be reoriented within the parking lot on a number of occasions during such operation. It is therefore necessary that the identification assigned thereto be clearly visible, from a wide variety of angles of view, and that it be securely fastened to the vehicle. The apparatus of the present invention is constructed in a manner such that it is easily seen, and is held against accidental disposition from the vehicle.

Further objectives include the provision of an identification member as aforesaid which is readily attachable to the vehicle, one which does not damage the vehicle or mar its appearance as clip-form articles are likely to do, and one which is inexpensive to manufacture and sell.

Other and further objects and advantages of the invention will become apparent to those skilled in the art from a consideration of the following specification when read in conjunction with the annexed drawing.

BRIEF DESCRIPTION OF THE DRAWING

FIG. 1 is a perspective view showing an identification member constructed and assembled in accordance with the teachings of this invention in use on two vehicles;

FIG. 2 is a perspective view of the invention apparatus prior to use;

FIG. 3 shows the apparatus as applied to a radio antenna on a vehicle or the like;

FIG. 4 is an enlarged top plan view of the apparatus; and

FIG. 5 is a vertical cross section taken substantially on the line 5—5 of FIG. 4, looking in the direction of the arrows.

DESCRIPTION OF THE PREFERRED EMBODIMENT

With more specific reference to the drawing, an identification member of this invention is therein designated generally by reference numeral 10 and is shown, in a non-limiting example, as applied to the radio antenna 12 of a motor vehicle 14. The vehicle may be one of a group thereof, and as will be observed in FIG. 1, the antennas of different vehicles are often arranged at various positions and angles with respect to the vehicles in a non-standard manner.

The identification member 10 includes a main body portion 16 and is constructed of a foldable material which tends to retain its folded condition following that operation, such as a semi-rigid plastic. The body portion is initially flat and rectangular as shown in FIG. 2. In practice of the invention, the devices 10 are sold and shipped in this flat form, and are adapted by the user to final form. In the configuration assumed by the invention in use, as shown in FIG. 3, the main body portion 16 comprises two panels, including a first panel 18 and a second panel 20. Each of the panels has a top edge, 22 and 24 respectively, and a bottom edge 26, 28. Moreover, each has an outer edge 30, 32. A medial fold portion 34 interconnects the panels at their proximal edges, the fold portion being curved about the antenna 12 and following its outer contour at the contact area with the upright support.

Each of the faces of the panels 18 and 20 has indicia thereon, here shown in the form of numerals 36, applied either by imprinting or otherwise. It will be observed in the drawings that the same numeral or indicia appears on each of the four faces of the two panels. The panels, as shown in FIG. 4, are related to one another at an angle such that each of the faces bearing the indicia is exposed when viewed from a given angle. Within the range of this exposure of the faces, and the numerals thereon, the numerals are readily viewable throughout the full periphery of view of the devices 10 when in use.

Connection means 38 for the detachable mounting of the devices on an antenna or other upright support comprises a cord 40 of loop form constructed preferably of some resilient material having elastic properties. The cord extends through coaligned openings 42 and 44 formed in the panels 18 and 20 adjacent their lower edges 24 and 28 and also adjacent the medial fold 34. The fold 34 has a cut-out slot 46 at the upper end thereof. The slot provides a means for the positioning of the body portion on the antenna prior to folding, and aids in retaining the position of the panel after folding.

In the use of the device, it is placed against the antenna 12 or other support in enveloping position as shown in the drawing, with the inside 48 of the fold contacting the antenna. The cord is placed in a lower loop 50 disposed about the antenna within the area between the panels, and the loop then extends up the two outer faces of the panels, in side by side strand portions 52 and 54. Thereafter, the cord is reverted again over the antenna, forming a second, top loop 56. The dual loops, on the top and lower areas of the body portion, and the extension of the cord on two sides of the body portion and the antenna securely but releaseably connects the body portion to the antenna. Release involves only stretching of the cord so that the upper loop is disengaged from encircling position about the antenna and subsequent removal of the lower loop therefrom.

Having described and illustrated one embodiment of this invention in some detail, it will be understood that this description and illustration have been offered only by way of example, and that the invention is to be limited in scope only by the appended claims.

What is claimed is:

1. An identification element for attachment to an upright support comprising:
    a body portion including panel means and a fold portion;
    the body portion panel means comprising a first panel and a second panel with the fold portion therebetween;
    the panels each having inner and outer faces; indicia on the panel means;
    the indicia appearing on each of said panels; and
    cord means having loops engaged about the upright support and strands engaging the body portion.
2. The invention of claim 1, wherein:
    each panel includes a lower edge; and
    the panels each having an opening therein, adjacent said lower edge, and the cord being extended through the opening.
3. The invention of claim 2, and:
    a slot in the fold portion remote from the openings.
4. The invention of claim 2 wherein:
    the panels are angularly related to one another.
5. The invention of claim 4, wherein:
    the cord is elastic.

References Cited

UNITED STATES PATENTS

| | | | |
|---|---|---|---|
| 1,595,395 | 8/1926 | Herbener. | |
| 2,909,147 | 10/1959 | Crowder | 116—173 |
| 3,170,260 | 2/1965 | Parker | 40—124 |
| 3,270,790 | 10/1966 | Booth | 40—145 |

EUGENE R. CAPOZIO, Primary Examiner

W. J. CONTRERAS, Assistant Examiner